United States Patent [19]
Munck et al.

[11] Patent Number: 5,576,489
[45] Date of Patent: Nov. 19, 1996

[54] MEASURING DEVICE FOR OSCILLATING PISTON LIQUID METER

[75] Inventors: Christophe Munck, Saint-Louis; Aimé Zimmermann, Cernay, both of France

[73] Assignee: Sappel, Saint-Louis Cedex, France

[21] Appl. No.: 422,230

[22] Filed: Apr. 14, 1995

[30] Foreign Application Priority Data

May 6, 1994 [FR] France .................................. 94 05607

[51] Int. Cl.⁶ ........................................................ C01F 3/08
[52] U.S. Cl. ................................ 73/257; 73/252; 73/253
[58] Field of Search ............................. 73/252, 239, 241, 73/253, 257, 256, 254

[56] References Cited

U.S. PATENT DOCUMENTS

| | | | |
|---|---|---|---|
| 582,302 | 5/1897 | Nash | 73/257 |
| 1,179,208 | 4/1916 | Monard | 73/257 |
| 1,973,670 | 9/1934 | Star | 73/257 |
| 2,016,347 | 10/1935 | Smith . | |
| 2,053,942 | 9/1933 | Bradley | 73/257 |

FOREIGN PATENT DOCUMENTS

| | | | |
|---|---|---|---|
| 467126 | 3/1914 | France | 73/257 |
| WO93/22631 | 11/1993 | WIPO . | |

Primary Examiner—Richard Chilcot
Assistant Examiner—Max H. Noori
Attorney, Agent, or Firm—William L. Feeney; Kerkam, Stowell, Kondracki & Clarke, P.C.

[57] ABSTRACT

A measuring device for a liquid meter with oscillating piston comprises a hollow chamber pierced with two apertures and limited by a cylindrical side wall, a bottom and a lid; a piston enclosed in said chamber and held movably, along a partition wall about a well. This device further comprises at least one groove, made in the corners formed between the bottom and the side wall of the chamber or the well or the piston, that opens into the hollow of the chamber, in a space formed between the well and the side walls, and is designed to receive deposits of particles introduced into said device by the liquid to be metered. The device can be applied in particular to water metering. FIG. 3

20 Claims, 5 Drawing Sheets

MEASURING DEVICE FOR OSCILLATING PISTON LIQUID METER

BACKGROUND OF THE INVENTION

1. Field of the Invention

The invention relates to the field of volumetric liquid meters and, particularly, to the field of volumetric water meters implementing a technique that is well known to those skilled in the art and is acknowledged for its precision and reliability, namely the technique of the oscillating piston.

2. Description of the Prior Art

Oscillating piston type volumetric water meters have a measuring device formed by a chamber enclosing a piston that is held movably on a flat bottom along a radial partition wall, and between a cylindrical internal wall of said chamber and an external wall of a small guiding cylinder forming a well positioned at the center of its bottom.

The principle of operation of these meters is illustrated schematically in FIGS. 1a to 1d which separate the different steps of the motion of the piston 3 in the chamber 2. During the metering operation, the water enters the device 1 by an intake aperture 13 placed on one side of the radial partition 12. This water fills the two intake housings located before the intake aperture 13, filling them to the maximum extent. A first housing is formed by the space between the external cylindrical wall of the piston 3 and the internal cylindrical wall of the chamber 2 and a second housing is formed by the space between the external cylindrical wall of the well 7 and the internal cylindrical wall of the piston 3. The water to be metered then conveys its energy to the piston 3 which slides along the bottom of the chamber 2 and oscillates in a movement that is characteristic of the technique of the oscillating piston. According to this technique, the axis of the cylinder forming the piston 3 describes a circle about the axis of the cylinder forming the chamber 2. A given volume of water is thus conveyed into two outflow housings towards an outflow aperture 14 positioned on the other side of the partition 12. These housings are located before said outflow aperture 14, one of them being formed by the space between the external wall of the piston 3 and the internal chamber wall of the chamber 2 and the other by the space between the external wall of the well 7 and the internal wall of the piston 3. There is thus a three-stage motion: intake, translation of a volume of water and outflow. This motion occurs in three dual stages since it is done simultaneously with a phase shift equal to PII inside and outside the piston 3.

The water flowing in the conduits conveys solid particles in suspension. These particles come sometimes from the calcareous furring that forms with time in the conduits themselves and that gets detached from time to time, being carried by the flowing water. At other times, these particles come from iron oxide deposits formed in the metal conduits. Furthermore, the water to be metered often conveys yet other particles such as sand particles or more generally siliceous matter.

During a tapping operation, namely when a subscriber to the water service opens a tap to take a quantity of water that he or she needs at a given time, the suspended particles in the water get introduced into the metering device. Here, they are driven rotationally by the piston and follow the path of the water in varying degrees up to the outlet aperture. When the tapping is over, the piston comes to a standstill and the particles that are still suspended in the water contained in the measuring device gradually get deposited slowly at the bottom of the chamber for they generally have a specific gravity greater than that of water. They then form a concentrated deposit referenced 30 in FIG. 2a.

During the next tapping operation, this concentrated deposit is pushed back by the rotating piston 3. It then migrates naturally to the bottom of the device, partly against the internal wall of the chamber 2 and partly against the external wall of the well 7. Here, the particles collect and are piled up, thus forming a wedge 31 shown in FIG. 2b which is carried incessantly by the piston 3 in the feed direction of this piston.

The particles, and especially the particles of siliceous matter which are highly abrasive, scratch and permanently damage the internal side walls of the chamber, the internal and external walls of the piston and the external walls of the well. The friction between the different elements of the device is then more intense and the clearance between the piston and the chamber are accentuated. This increases the leakage of water between the housings. The precision and reliability of the measuring device are thus diminished.

Furthermore, the accumulation of the particles 31 hampers the rotation of the piston 3 and distorts the metering, especially when the piston oscillates at a low rate and then becomes highly sensitive to the forces countering its rotation. The wrong results then obtained are often beyond the permissible limits defined by the legislation in force in most countries.

Furthermore, the wedge 31 may stop the rotation of the piston 3 and block it. In this case, it will be necessary to wait for a tapping at high flow rate so that the water introduced at high pressure create a degree of turbulence in the device that is sufficient to disperse this wedge 31. The solid particles are then again suspended in the water by the piston which resumes its travel. However, they remain to a great extent trapped in the device. It is only with time and provided that the water introduced into the chamber is totally clear, namely totally free of particles, that all the particles will be eliminated. If not, the blocking will probably recur at a later date.

The present invention is aimed at proposing a measuring device that overcomes the above-mentioned drawbacks at lower cost and makes it possible notably to prevent, firstly, the deterioration of said device by the solid particles introduced by the liquid to be metered and secondly the hampering and locking of the piston, and at the same time provides for efficient metrological or industrial measuring performance characteristics even under light operating conditions.

This aim as well as others that shall appear hereinafter are achieved by the presence, in the device, of a groove for the recovery of the particles.

SUMMARY OF THE INVENTION

Thus, the invention proposes a measuring device for a liquid meter with oscillating piston comprising:
- a hollow chamber pierced with two apertures and limited by a cylindrical side wall, a bottom and a lid;
- a piston enclosed in said chamber and held movably along a partition wall about a well;
- wherein this device further comprises:
  - at least one groove made in the corners formed between the bottom and elements supported by the bottom, that opens into the hollow of the chamber, in a space formed between the well and the side walls, and is designed to receive deposits of particles introduced into said device by the liquid to be metered.

The following description, which is in no way restrictive, will provide for a clearer understanding of the way in which the invention can be put into practice.

BRIEF DESCRIPTION OF THE DRAWINGS

It must be read with reference to the appended drawings, of which.

MORE DETAILED DESCRIPTION

Since FIGS. 1a to 1d, 2a and 2b have been described in the above introduction, they shall not be re-examined herein. However, these figures are an integral part of the following description of the invention. Hence, the same references are used in all the FIGS. 1 to 7.

Figure 1A:
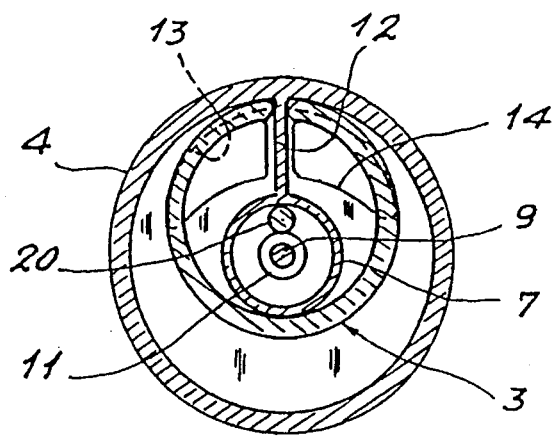
FIGS. 1a to 1d provide a schematic illustration in a sectional and top view of the principle of operation of a measuring device for liquid counter with oscillating piston according to the prior art or according to the invention, without distinction.
Figure 1B:
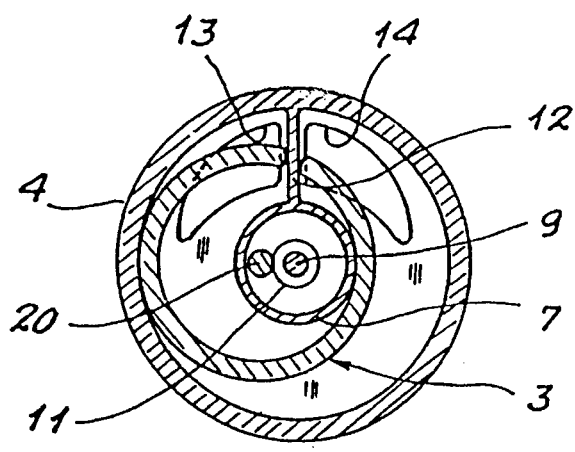
Figure 1C:
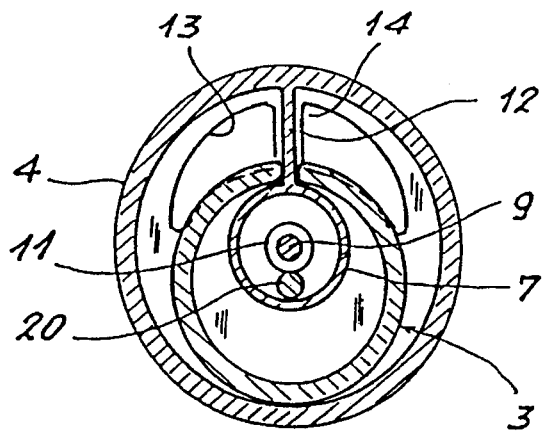
Figure 1D:
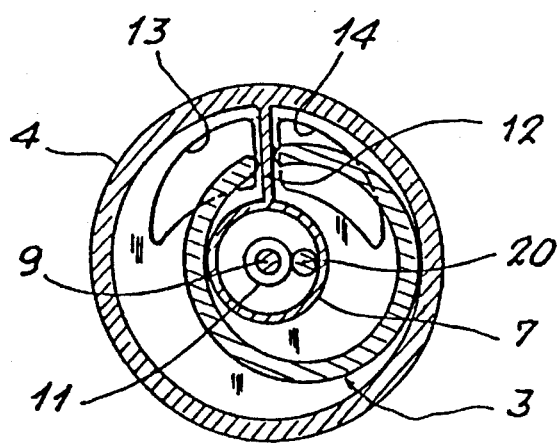
Figure 2A:
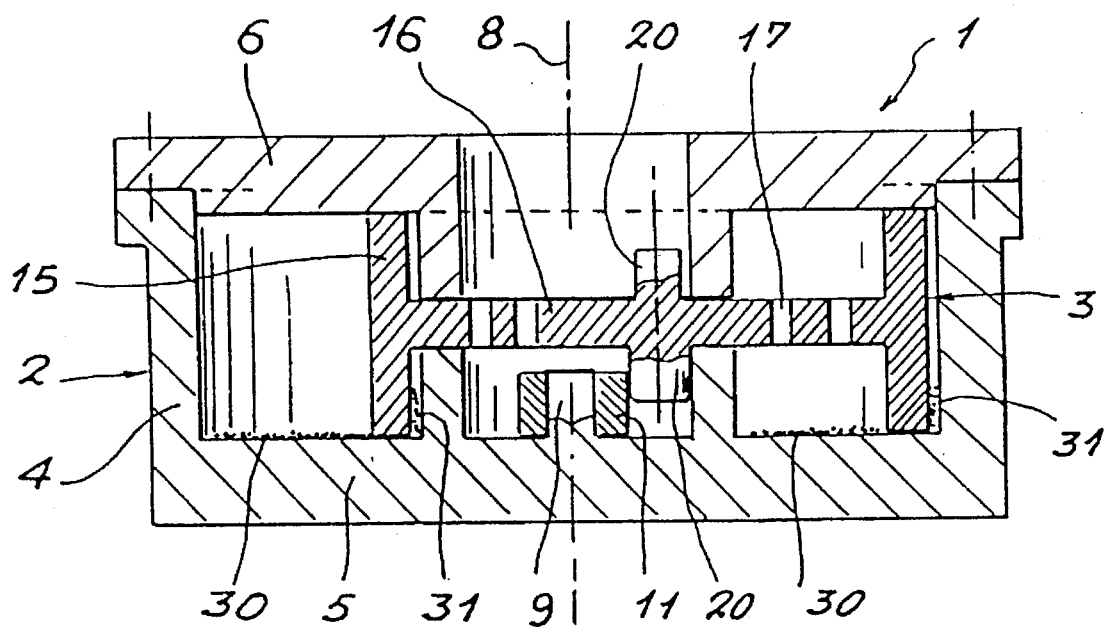
FIG. 2a shows a longitudinal sectional and side view of an accumulation of solid particles such as exists in the measuring devices of the prior art.
Figure 2B:
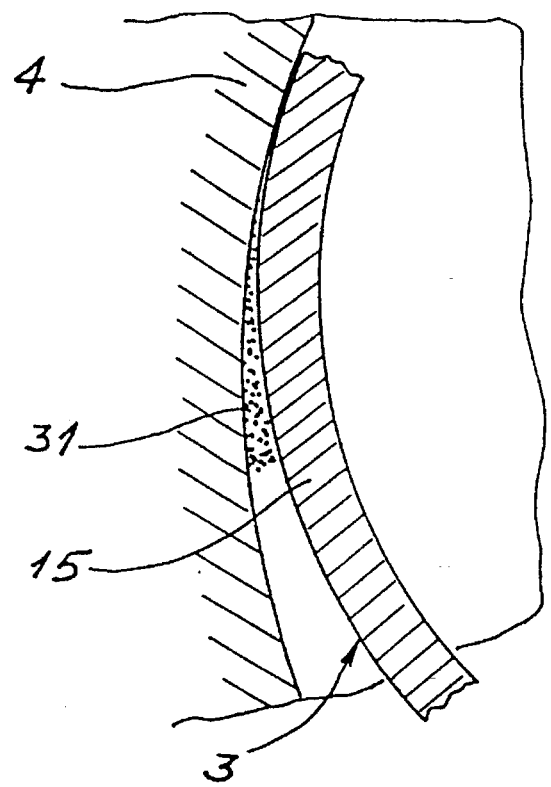
FIG. 2b shows a cross-sectional and top view of a detail of an accumulation of solid particles such as they exist on the periphery of a piston of a measuring device of the prior art.
Figure 3:
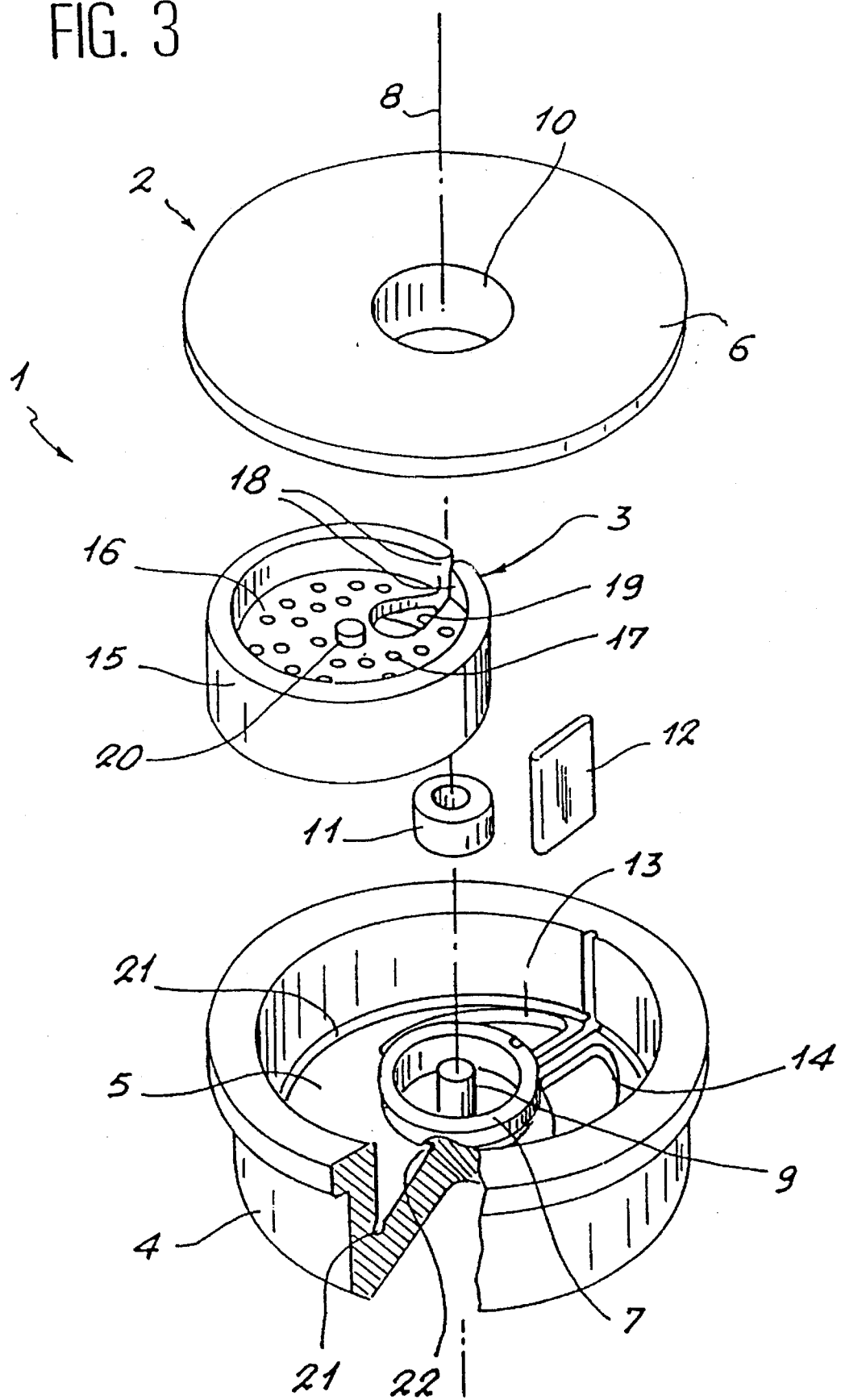
FIG. 3 shows an exploded view of a measuring device according to the invention.
Figure 4:
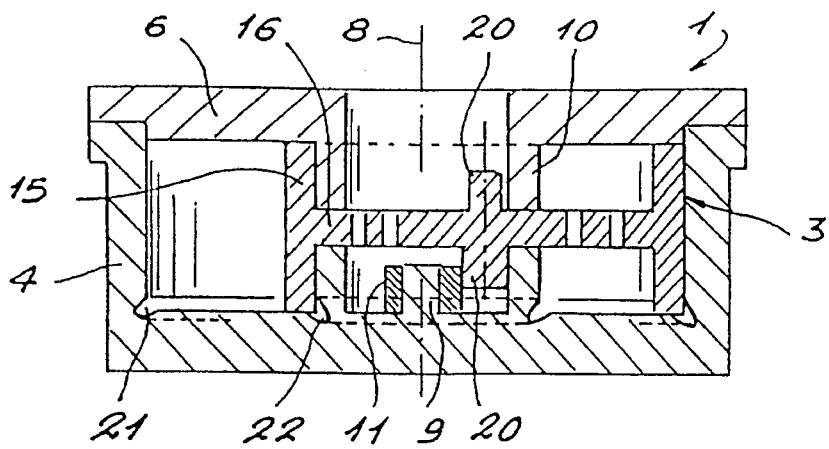
FIG. 4 shows a longitudinal sectional view of a measuring device according to the invention.

FIG. 3 shows a measuring device 1 according to the invention. This device 1 has a chamber 2 and a piston 3.

The chamber 2 is hollow. It is limited by a cylindrical side wall 4, a flat circular bottom 5 supporting said side wall 4 and a lid 6. A small cylinder or well 7 is supported by the bottom 5. This well 7 is centered on an axis 8 of the chamber 2 which takes the form, in the center of the well 7, of a central stub 9 on which a rotating roller 11 is placed. Another small cylinder 10 having the same diameter as the well 7 is centered on the axis 8. It is borne by the lid 6. A fixed partition wall 12 is positioned on the internal side of the side wall 4 of the chamber 2 and extends radially throughout the height of this side wall 4 up to the small cylinders 7, 10. Furthermore, the bottom 5 of the chamber 2 has two apertures, an intake aperture 13 and an outlet aperture 14 positioned on each side of the partition 12.

The piston 3 is supported by the bottom 5 of the chamber 2 in which it is enclosed. It is formed by a cylinder 15 which is divided, in its median part, by a flat wall 16 perforated with through holes 17. The diameter of the piston 3 is substantially smaller than the diameter of the chamber 2. A vertical cut 18 is made along a generatrix line of the cylinder 15 forming the piston 3 and opens out, at the flat wall 16, into a pear-shaped aperture 19. The flat wall 16 of the piston 3 is provided, at the center of each of its two faces, with a stub 20.

When the lid 6 of the chamber 2 is closed, the edges of the small cylinders 7, 10 meet the flat wall 16 of the piston 3 so that said piston 3 remains free in its plane movements. The partition 12 is then engaged between the edges of the ridge 18 within the pear 19. Thus, when the liquid to be metered penetrates the device 1 by the intake aperture 13, the piston 3 oscillates in the chamber 2 according to the mechanism described in the introduction and shown schematically in FIGS. 1a to 1d.

The measuring device 1 has at least one groove 21, 22 made at the corners formed between the bottom 5 and the different elements 3, 4, 7 which are perpendicular to this bottom 5. These elements notably are the internal cylindrical wall 4 of the chamber 2 and the external cylindrical wall of the well 7. However, according to one embodiment (not shown in the drawings), the internal and external cylindrical walls of the piston 3 may also have a groove such as this.

The grooves 21, 22 open into the hollow of the chamber 2, in a space formed between the well 7 and the side walls 4, namely in the space in which the water to be metered flows. This is the space in which the conveyed solid particles that are introduced into the device 1 collect and get deposited.

The grooves 21, 22 are formed for example during the machining of the chambers 2. However, they may also be obtained at the very stage when these cylinders are being made by injection-molding.

The groove referenced 21 is made at the bottom of the cylindrical side wall 4 of the chamber 2 at the corner between the bottom 5 and this wall 4.

The groove referenced 22 is made at the bottom of the outside wall of the well 7 at the corner between the groove 5 and this wall.

The grooves 21, 22 are made on the entire periphery of the elements 4, 7 comprising them, except for the place in which the partition wall 12 is located.

The profile of the grooves 21, 22 is advantageously constant all along the periphery of the elements 3, 4, 7. However, these grooves 21, 22 may have a variety of profiles.

FIGS. 5a to 5i show different types of profiles of groove 21, 22 according to the invention.

Figure 5A:
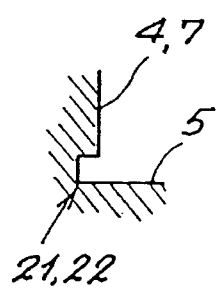
FIGS. 5a to 5i show a cross-sectional view of different profiles of grooves of a measuring device according to the invention.
Figure 5D:
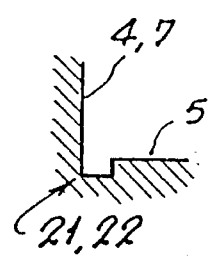
Figure 5G:
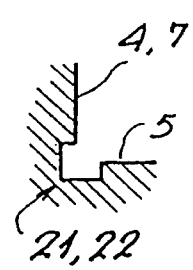
Figure 5B:
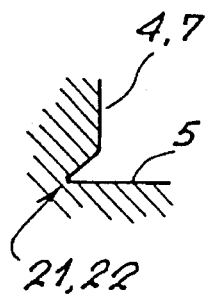
Figure 5E:
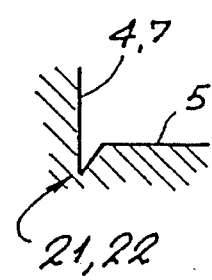
Figure 5H:
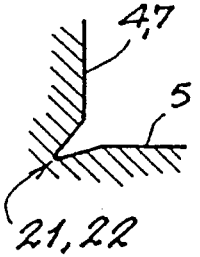
Figure 5C:
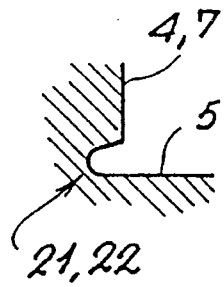

In FIGS. 5a, 5b and 5c, the groove 21, 22 is made in the element 4, 7 which is perpendicular to the bottom 5 and solely in this element. The bottom of the groove may then be flat (FIG. 5a), concave (FIG. 5c), or angular (FIG. 5b).

Figure 5F:
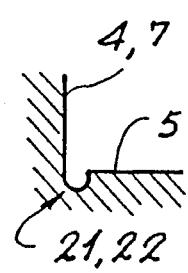

By contrast, in FIGS. 5d, 5c, 5f the groove is made in the bottom 5 of the chamber 2 and solely in this bottom 5. Here too, different groove profiles are possible and in particular the profiles where its bottom is plane (FIG. 5d), concave (FIG. 5f), or angular (FIG. 5e).

Figure 5I:
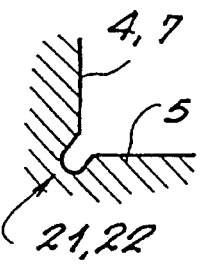

Finally, in FIGS. 5g, 5h and 5i, the groove 21, 22 is made in the vertical element 4, 7 supported by the bottom 5 as well as in this bottom 5. Here too, different profiles of the bottom of the groove are possible, especially the 90° angle profile (FIG. 5g), the acute angle profile (FIG. 5h) and the concave profile (FIG. 5i).

Naturally, any combination of the above-mentioned profiles constitutes a groove profile that is suitable for the implementation of the invention.

Figure 6:
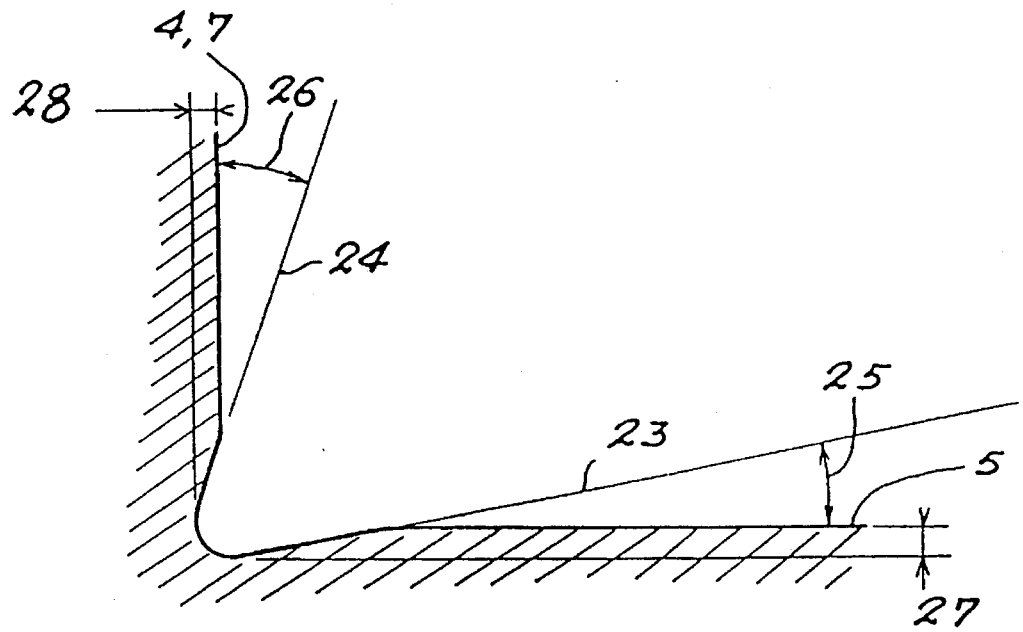
FIG. 6 shows a cross-sectional and detailed view of a profile of a groove advantageously implemented in a measuring device according to the invention.

However, certain grooves 21, 22 are better suited to the implementation of the invention than other grooves. This is the case with the groove 21, 22 whose profile is shown in FIG. 6. This groove 21, 22 is made in a device 1 whose chamber 2 has a diameter of about 6 cm and a height of about 3 cm. It is a groove of the 5i type. It is formed both in the vertical wall of the element 4, 7 and in the bottom 5. Its bottom is concave along a radius of curvature equal approximately to 0.5 mm. The profile of this groove 21, 22 is generated by two straight lines 23 and 24, the first one forming an angle 25 with the bottom 5 and the second one forming an angle 26 with the wall 4, 7. The angle 25 is equal to about 10° and the angle 26 is equal to about 20°. Furthermore, the depth 27 of the groove 21, 22 in the bottom 5 is equal to about 0.2 mm. This depth 27 is substantially equal to the depth 28 of the notch made in the vertical walls of the elements referenced 4 to 7.

The grooves 21, 22 constitute a channel that gives rise to leakages of liquid between the different housings. These leaks are liable to disturb the metering. Hence, the dimensions of the grooves 21, 22 are big enough for said grooves to produce the effects that they are designed to produce and small enough to limit the leakage due to their presence so that this leakage does not disturb the metering operation. An appropriate ratio between the total volume of the grooves made in a metering device and total volume of water that can be contained in this device may be a value ranging from 0.05 thousandths to 20 thousandths. Furthermore, the grooves are advantageously made in the bottom 5 so that the particles are sufficiently held within these grooves.

Figure 7:
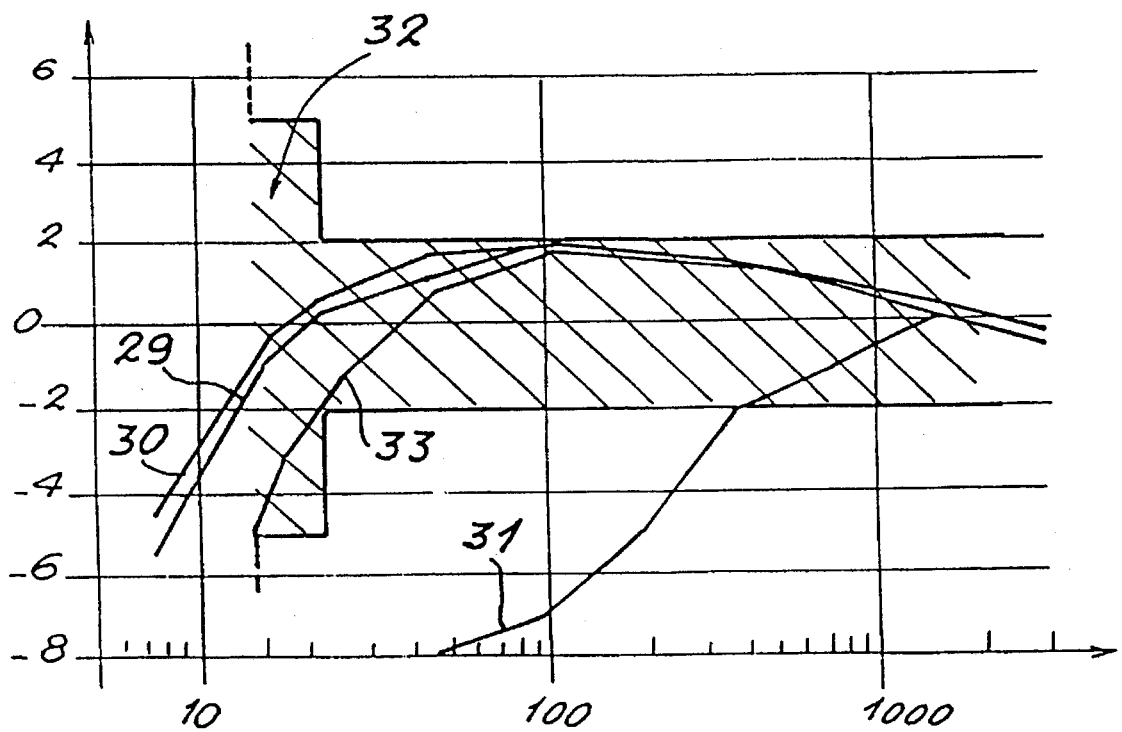
FIG. 7 illustrates the improved results that may be achieved by a device according to the invention as compared with a prior art measuring device.

The example of FIG. 6 meets these conditions. Referring to FIG. 7, error curves are shown. These curves represent the error, in terms of percentage, in the computation of the volume of water measured as a function of the water flow rate, measured in liters per hour, introduced into measuring devices.

The first curve referenced 29 is obtained for a prior art measuring device in which there flows clear, particle-free water. The second curve 30 is obtained for clear water for a measuring device according to the invention provided with grooves 21, 22 whose profile is that of FIG. 6. A third curve 31 is obtained for a prior art measuring device having suspended particles. Finally, a fourth curve 33 is obtained with particle-charged water for a measuring device according to the invention.

The curves 29 and 30 are very close to each other and throughout the measurement the difference between them is less than 1%. Consequently, the grooves 21, 22 are not channels for the leakage of liquid between the housings that could substantially modify the results of a measurement. The curve 31 indicates an error of up to 100% at the small flow rates. The curve 31 goes out of the hatched zone 32 corresponding to a zone of permissibility defined by certain current regulations on water metering operations. This is not the case with the curve 33 which, at small flow rates, gives an error of about 3% with respect to the curves 29 and 30. The improvement provided by the invention is therefore considerable and surprising.

At the end of a first tapping operation, the particles suspended in the water are deposited on the bottom 5. In a second tapping operation, these particles are conveyed by the piston 3 which pushes them up to the grooves 21, 22 where they collect and settle. However, the above-mentioned effects are attenuated when the grooves are made on the body of the piston 15. Indeed, the groove is then mobile on the bottom 5. This actually induces a return to a suspended state of the particles in the measuring device 1. Furthermore, the grooves 21, 22 are emptied of particles that they have collected during the different tapping operations by a tapping at a high flow rate that causes a degree of turbulence sufficiently great to put these particles back into a state of suspension in the metered water.

What is claimed is:

1. A measuring device for a liquid meter with oscillating piston comprising:
   a hollow chamber pierced with two apertures and limited by a cylindrical side wall, a bottom and a lid;
   a piston enclosed in said chamber and held movably, along a partition wall about a well;
   wherein this device further comprises:
   at least one horizontal groove, made in the corners formed between the bottom and elements supported by the bottom, that opens into the hollow of the chamber, in a space formed between the well and the side walls, and is designed to receive deposits of particles introduced into said device by the liquid to be metered.

2. A device according to claim 1, wherein a groove is made in the corner between the bottom and the cylindrical side wall of the chamber.

3. A device according to claim 1, wherein a groove is made in the corner between the bottom and the external wall of the well.

4. A device according to claim 3, wherein the grooves are made in the bottom as well as in the elements supported by this bottom.

5. A device according to claim 4, wherein the groove is made on the entire periphery of the elements that comprise it.

6. A device according to claim 5, wherein the groove has a profile whose bottom is concave.

7. A device according to claim 6, wherein the volume of the grooves, represented in relation to the volume of water that a device may contain, ranges from 0.05 thousandths to 20 thousandths.

8. A device according to claim 3, wherein the groove is made on the entire periphery of the elements that comprise it.

9. A device according to claim 3, wherein the groove has a profile whose bottom is concave.

10. A device according to claim 3, wherein the volume of the grooves, represented in relation to the volume of water that a device may contain, ranges from 0.05 thousandths to 20 thousandths.

11. A device according to claim 2, wherein the grooves are made in the bottom as well as in the elements supported by this bottom.

12. A device according to claim 2, wherein the groove is made on the entire periphery of the elements that comprise it.

13. A device according to claim 2, wherein the groove has a profile whose bottom is concave.

14. A device according to claim 2, wherein the volume of the grooves, represented in relation to the volume of water that a device may contain, ranges from 0.05 thousandths to 20 thousandths.

15. A device according to claim 1, wherein the grooves are made in the bottom as well as in the elements supported by this bottom.

16. A device according to claim 1, wherein the groove is made on the entire periphery of the elements that comprise it.

17. A device according to claim 1, wherein the groove has a profile whose bottom is concave.

18. A device according to claim 1, wherein the volume of the grooves, represented in relation to the volume of water that a device may contain, ranges from 0.05 thousandths to 20 thousandths.

19. A device according to claim 1 wherein the at least one groove extends around the entire periphery of the elements which comprise it except for, at most, the radial location of the partition wall.

20. A device according to claim 1 wherein the at least one groove includes an outer peripheral horizontal groove between the bottom and the cylindrical side wall of the chamber and an inner peripheral horizontal groove between the bottom and the external wall of the well.

* * * * *